/ 
United States Patent Office 3,050,542
Patented Aug. 21, 1962

3,050,542
ORTHO-DISILYL BENZENES
William A. Piccoli, Pittsburgh, Pa., assignor to Dow Corning Corporation, Midland, Mich., a corporation of Michigan
No Drawing. Filed Aug. 14, 1959, Ser. No. 833,691
4 Claims. (Cl. 260—448.2)

This invention relates to certain ortho-disilyl benzenes and to the indan type of disiloxanes derivable therefrom.

The compounds of this invention can be defined specifically as (A) ortho substituted benzenes of the formula $C_6H_4(SiR_2H)_2$ and (B) 1,1,3,3-tetraorgano-1,3-disila-2-oxa-indan of the formula

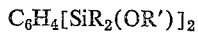

in the above formulae each R being a radical selected from the group consisting of methyl, ethyl, vinyl, and phenyl radicals. Each R radical can be the same as or different from its fellow R radicals.

The structure of the above defined compounds will perhaps be better understood by reference to the following structural formulae:

(A)

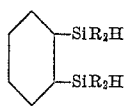

(B)

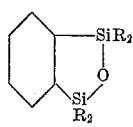

The (A) compounds shown above can be alkoxylated to form ortho substituted benzenes of the formula $$C_6H_4[SiR_2(OR')]_2$$

where R' is an alkyl radical of from 1 to 5 inclusive carbon atoms.

Compounds of the (A) type described above can be prepared by using an "in situ Gringnard" technique. In this process, a mixture of O-iodobromobenzene and $R_2SiHX$, where each R is methyl, ethyl, vinyl or phenyl and X is Cl or Br, is reacted with magnesium. In this manner the formation of the Grignard reagent and its reaction with the silane are almost simultaneous, thus minimizing side reactions which make other techniques unsuccessful. It is usually preferable that the mixture of O-iodobromobenzene and silane be further diluted with an inert solvent prior to contacting the reactants with the magnesium. Solvents such as diethyl ether, tetrahydrofuran or hydrocarbon solvents such as toluene, xylene, petroleum ethers and the like are suitable. This dilution is not absolutely essential, however, and if desired the reaction can be carried out with nothing other than the reactants as diluents.

As with conventional Grignard reactions, it is preferable here to employ magnesium in a form which provides a large surface area, i.e. as a powder, chips, or "turnings" obtained by shaving a block form of magnesium. It is preferred to use approximately equivalent amounts of magnesium, halobenzene, and silane, although a 10 to 15 mol percent excess of any one reactant may be desirable.

The above in situ Grignard reaction is exothermic, and suitable reaction temperatures depend largely upon the particular equipment which may be available. When low boiling inert solvents are present, it is generally desirable either to add the reactants at a slow rate or to cool the reaction to keep it under control while the liquid reactants are being added to the magnesium, otherwise the reaction should be carried out at super-atmospheric pressure. In general, any temperature is suitable for the reaction so long as a liquid phase is maintained, but a range of from 25° to 100° C. is preferred. Once the reaction is underway, it proceeds readily merely by the addition of the liquid reactants to the magnesium. In order to start the reaction, however, it is often desirable to employ the conventional techniques for initiating Grignard reactions, such as the addition of minute amounts of iodine to the system or the addition of minute amounts of highly reactive halides such as methylbromide to the magnesium before beginning the addition of the O-iodobromobenzene. The reactants should, of course, be as nearly anhydrous as possible.

The magnesium salts which are formed during the reaction can be removed from the reaction product by filtration. Although it is not necessary to isolate the hydrogenosilane product, it is usually desirable to do so.

The $R_2SiHX$ reactants referred to above are well known compounds. They can be prepared, for example, by reacting the corresponding Grignard reagent or reagents RMgCl or RMgBr with $HSiCl_3$ or $HSiBr_3$.

The O-(bis-diorganohydrogenosilyl)benzene product from the above reaction can be converted to the corresponding alkoxy substituted compound by reacting it with the corresponding alcohol R'OH, where R' is an alkyl radical of from 1 to 5 inclusive carbon atoms. This reaction preferably is conducted in the presence of an alkali metal hydroxide such as NaOH or KOH as a catalyst. The amount of catalyst is not critical, but preferably ranges from about 0.05 to 2 percent by weight based on the weight of the silane reactant.

The amount of alcohol employed in the above reaction is by no means critical, but it is best that an amount be used which is at least equivalent to the amount of silicon-bonded hydrogen present in the silane reactant. Preferably the alcohol is employed in a 2 to 5 fold excess over the equivalent amount. Although this reaction may proceed slowly at ordinary room temperatures, i.e., temperatures of about 25° C., it is preferred to expedite the reaction and improve the yield by heating the reactants at temperatures up to about 150° C. A convenient method of operation is to heat the reactants at the reflux temperature of the system at atmospheric pressure, although super-atmospheric pressure can be employed if desired.

The alkoxy substituted silanes described above can be converted to the indan type of disiloxane by hydrolysis. Preferably this hydrolysis is carried out in the presence of an alcohol (which may or may not be an alcohol corresponding to the alkoxy substituents present), and in the presence of an alkaline catalyst such as NaOH or KOH. Again the ratio of reactants employed is not of great importance, but preferably there should be sufficient water present to hydrolyze all of the silicon-bonded alkoxy groups present, and it is most preferred that the water be present in a two- to ten-fold excess.

The hydrogenosilanes of this invention can be used as intermediates in SiH addition reactions with unsaturated organic reactants or with alkenyl substituted organosilicon compounds. Either one or both of the silicon-bonded hydrogen atoms can be so reacted. Such reactions can be carried out in the presence of catalysts such as organic peroxides, or platinum in high surface area form or in the form of chloroplatinic acid. These general types of addition reactions are well known, and are described, for example, in U.S. Patents 2,823,218, issued February 11, 1958, and 2,637,738, issued May 5, 1953.

The hydrogenosilanes of this invention are also of utility as intermediates in the preparation of the described alkoxysilanes. The major utility of the latter compounds lies in their hydrolysis to form the indan type compounds, and in their cohydrolysis with conventional organohalosilanes or organoalkoxysilanes to form copolymeric organosiloxanes in their typical fluid, rubbery, or resinous states. The latter are similar to conventional organopolysiloxanes except that they are modified by the incorporation of ortho-phenylene linkages. The organosiloxane copolymers thus formed are adaptable to all of the well known uses of conventional organosiloxane fluids, elastomers, and resins, e.g., uses as lubricants, rubber, electrical insulation, and laminating resins. Low temperature properties can be improved by the presence of the phenylene linkages.

The indan type of disiloxane can be copolymerized with conventional linear, cyclic, or cross-linked organosiloxanes to produce the corresponding liquid, elastomeric, or resinous organosiloxanes modified by ortho-phenylene linkages between some of the silicon atoms. The indan type compounds can also be homopolymerized to form the corresponding siloxane homopolymers. The latter are usually in liquid form and can be used as hydraulic fluids and the like.

The following examples are illustrative only and are not intended to limit the invention. The symbols Me, Et, Vi and Ph have been used to represent methyl, ethyl, vinyl, and phenyl radicals respectively.

Example 1

A mixture of 125 g. (0.44 mol) O-iodobromobenzene, 92 g. (0.97 mol) Me$_2$SiHCl, and 620 ml. diethyl ether was added over a period of 1.25 hours to 21.5 g. (0.88 g. atom) of magnesium turnings. The reaction mass was then heated at reflux temperature for 2.5 hours and the magnesium salts were removed by filtration. The filtrate was added to cold water to decompose any residual Grignard reagent and to hydrolyze any unreacted chlorosilanes which might be present. The ether layer was washed with water, dried, and distilled to provide the ortho substituted compound C$_6$H$_4$(SiMe$_2$H)$_2$, B.P. 129° C./50 mm. Hg, $n_D^{25}$ 1.5101, $d_4^{25}$ 0.893, $r_D$ 0.3334. Analysis showed a silicon-bonded hydrogen content of 1.08 percent, which agreed with the calculated theoretical value. The structure of the compound was confirmed by its nuclear magnetic resonance (NMR) spectrum.

Example 2

When MeEtSiHCl, Ph$_2$SiHBr, or MeViSiHCl are substituted for the Me$_2$SiHCl in the process of Example 1, the corresponding ortho substituted benzenes of the formulae C$_6$H$_4$(SiMeEtH)$_2$, C$_6$H$_4$(SiPh$_2$H)$_2$, and C$_6$H$_4$(SiMeViH)$_2$ respectively are produced.

Example 3

A solution of 26.2 g. (0.135 mol) of the product from Example 1 in 46 g. (1 mol) ethanol was mixed with 0.15 g. powdered NaOH. The mixture was heated for 6 hours at 83° C., after which time 92 percent of the theoretical hydrogen had been evolved, and then for 17 hours at 80° C. to complete the reaction. The mixture was cooled, neutralized with glacial acetic acid, and distilled to provide the ortho substituted product C$_6$H$_4$[SiMe$_2$(OC$_2$H$_5$)]$_2$, B.P. 161° C./26 mm. Hg, $n_D^{25}$ 1.4870, $d_4^{25}$ 0.958, $r_D$ 0.3002 (calculated 0.3006). The structure of the product was confirmed by both NMR and infrared spectra.

Example 4

When the products of Example 2 are alkoxylated by the procedure of Example 3, the ortho substituted products C$_6$H$_4$[SiMeEt(OC$_2$H$_5$)]$_2$, C$_6$H$_4$[SiPh$_2$(OC$_2$H$_5$)]$_2$, and C$_6$H$_4$[SiMeVi(OC$_2$H$_5$)]$_2$ are obtained.

Example 5

A mixture of 16.6 g. (0.059 mol) of the product from Example 3, 29.2 g. (0.63 mol) ethanol, and 3.5 g. (0.19 mol) water was heated at reflux for 4 hours in the presence of 0.15 g. powdered KOH. An additional 4 g. (0.22 mol) water was then added and refluxing was continued for an additional 2 hours. The reaction mass was concentrated by removing volatiles, diluted with 50 ml. benzene, concentrated once again by removing volatiles, and further diluted with an additional 50 ml. benzene. The resulting solution was washed with water until neutral, dried over sodium sulfate, and distilled to provide a crystalline product. Recrystallization from the latter product provided the pure compound 1,1,3,3-tetramethyl-1,3-disila-2-oxa-indan of the formula C$_6$H$_4$Si(Me)$_2$OSiMe$_2$
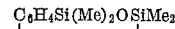

B.P. 117° C./53 mm. Hg, $n_D^{25}$ (supercooled) 1.4892, $d_4^{25}$ (supercooled) 0.960, $r_D$ 0.3006 (calculated value 0.3000), M.P. 38.5° C. The structure of the product was confirmed by both NMR and infrared spectra.

Example 6

When the products of Example 4 are subjected to the hydrolysis procedure of Example 5, the respective ortho-substituted compounds C$_6$H$_4$Si(Me)(Et)OSiMeEt
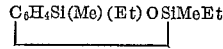

C$_6$H$_4$Si(Ph)$_2$OSiPh$_2$
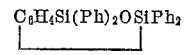

and

C$_6$H$_4$Si(Me)(Vi)OSiMeVi
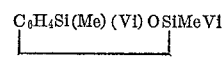

are produced.

Example 7

When a mixture of MeEtSiHCl and PhViSiHCl is used in place of the Me$_2$SiHCl in the process of Example 1, a mixture of products is obtained which includes the ortho-substituted compound (MeEtHSi)C$_6$H$_4$(SiPhViH). When the latter is subjected to the alkoxylation process of Example 3, the corresponding derivative is obtained which contains ethoxy groups in place of the silicon-bonded hydrogen atoms. When the alkoxylated product is subjected to the hydrolysis process of Example 5, the corresponding indan of the formula C$_6$H$_4$Si(Me)(Et)OSiPhVi
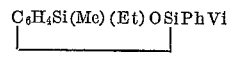

is produced.

The indan products of Examples 5 to 7 above can be polymerized or copolymerized with other organosiloxanes by using conventional siloxane polymerization catalysts and conditions.

Example 8

A portion of the indan product from Example 5 was heated for 8 hours at 100° C. in the presence of a minute amount of potassium dimethylsilanolate as a catalyst. Upon cooling it was found that the crystalline starting product had been converted to a low viscosity oil having a viscosity of 3.4 cs. at 25° C. and $n_D^{25}$ of 1.4974. 5 parts by volume of this oil and 35 parts by volume of (Me$_2$SiO)$_4$ were mixed and heated at 100 to 150° C. for about 10 minutes in the presence of a minute amount of powdered KOH as a catalyst. The viscous oil which was obtained was twice extracted with methanol to remove any unreacted cyclics and was then dried in a vacuum oven at 95° F. It was shown by an ultra-violet analysis of the resulting viscous organosiloxane product that a copolymer of the two starting cyclic compounds had been produced.

That which is claimed is:

1. An ortho-disilyl benzene selected from the group consisting of (A) ortho substituted benzenes of the formula $C_6H_4(SiR_2H)_2$ and (B) 1,1,3,3-tetraorgano-1,3-disila-2-oxa-indan of the formula

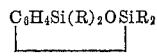

in the above formula each R being a radical selected from the group consisting of methyl, ethyl, vinyl, and phenyl radicals.

2. An ortho substituted benzene having the formula $C_6H_4[Si(CH_3)_2H]_2$.

3. 1,1,3,3-tetramethyl-1,3-disila-2-oxa-indan having the formula

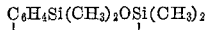

4. A method for the production of an O-(bis-diorganohydrogenosilyl)benzene which comprises reacting a mixture of O-iodobromobenzene and a silane of the formula $R_2SiHX$, where each R is a radical selected from the group consisting of methyl, ethyl, vinyl, and phenyl radicals and X is selected from the group consisting of Cl and Br, with magnesium, by contacting the reactants in a liquid phase, and separating the O-(bis-diorganohydrogenosilyl)benzene from the reaction product.

References Cited in the file of this patent

UNITED STATES PATENTS

| | | |
|---|---|---|
| 2,486,162 | Hyde | Oct. 25, 1949 |
| 2,561,429 | Sveda | July 24, 1951 |
| 2,562,000 | Sveda | July 24, 1951 |
| 2,689,860 | Rust | Sept. 21, 1954 |
| 2,709,692 | Gainer | May 31, 1955 |
| 2,967,171 | Barnes et al. | Jan. 3, 1961 |

OTHER REFERENCES

Topchiev et al.: Doklady Akad. Nauk, SSSR, vol. 109 (1956), pages 332–5 (Chem. Abstracts, vol. 51, (1957), pp. 1826–7).

Price: Jour. Am. Chem. Soc., vol. 69 (1947), pages 2600–4.

UNITED STATES PATENT OFFICE
CERTIFICATE OF CORRECTION

Patent No. 3,050,542                          August 21, 1962

William A. Piccoli

It is hereby certified that error appears in the above numbered patent requiring correction and that the said Letters Patent should read as corrected below.

Column 3, line 74, the formula should appear as shown below instead of as in the patent:

$$C_6H_4[SiMeVi(OC_2H_5)]_2$$

Signed and sealed this 16th day of April 1963.

(SEAL)
Attest:

ERNEST W. SWIDER
Attesting Officer

DAVID L. LADD
Commissioner of Patents